United States Patent Office 3,681,254
Patented Aug. 1, 1972

3,681,254
METHOD OF FORMING A GELABLE DISPERSION
Andrew D. Becker, Stoneham, Mass., assignor to Itek Corporation, Lexington, Mass.
No Drawing. Filed Mar. 30, 1970, Ser. No. 23,972
Int. Cl. B01j 13/00
U.S. Cl. 252—311                                     8 Claims

ABSTRACT OF THE DISCLOSURE

A method is disclosed for forming a stable gelable dispersion wherein a temperature-dependent gel former is uniformly dispersed throughout a liquid medium which is to be gelled. The method comprises: (a) adding the gel former to the liquid medium in sufficient quantities to gel it; (b) heating the mixture to an elevated dispersion temperature which is below the gel critical temperature; (c) uniformly dispersing the gel former throughout the liquid medium at the elevated dispersion temperature and, (d) cooling said dispersion to an ambient temperature significantly below said elevated dispersion temperature.

BACKGROUND OF THE INVENTION

(1) Field of the invention

This invention relates to a method for forming a uniform stable dispersion of a temperature-dependent gel former in a liquid medium.

(2) Description of the prior art

Gelled solutions are coherent colloidal dispersions which exhibit the mechanical characteristics of the solid state. They are formed from nonstructured colloidal dispersions which, upon conditioning, form the structured gel that exhibits the desired mechanical properties. Such colloidal dispersions are composed of a liquid medium to be gelled and a gel-forming agent, usually present in small amounts. The gel former forms a structure which has the capability of holding the liquid medium within it, and allowing the liquid solution so held to pass through the structure by diffusion. The internal structure, once formed, is not altered by the composition of the liquid medium or physical position of the gel.

The term "gelled solution" as used herein should be differentiated from gelatine, jelly, gel-like, or viscous substances, in that gelled solutions have a structure which has a yield point and break strength which can be measured mechanically like any other solid. In short, the term "gelled solution" is used to mean a solution in which the gel former has formed a structured network which contains the liquid components of the solution in a rigid but elastic form.

The term "gelable solution" is used herein to mean a solution or dispersion which can be converted to a gelled solution by heating it to a certain gel critical temperature followed by cooling below a setting or gelation temperature. The gel former forms a solid structure. This process starts with gradual cooling whereupon short molecular chains begin to form but do not become linked. During this stage, the dispersion can properly be called a sol. Continued cooling extends the molecular chains and begins their interconnection until a solid structure is formed at the gelation or setting temperature.

It is often desirable to store or ship gelable solutions prior to converting them to the gelled state. Because of their nature, there have been only two prior methods for accomplishing this without having the dispersion separate into two separate phases, i.e. a liquid phase and a gel former phase, which usually settles to the bottom of a container. Consequently, these mixtures have to be remixed prior to gelation to reobtain a uniform dispersion of gel former throughout the liquid to be gelled. This presents a particularly objectionable problem when a manufacturer of the dispersions intends to ship the ungelled dispersions in large volumes to an ultimate user who is not equipped with the large mixing equipment required to mix gelable dispersions. Heretofore, there have only been two methods of shipment available, and neither has proved to be a satisfactory solution to the problem.

The first method was to store and ship these materials in their solid gelled form. This method has obvious drawbacks and has resulted in many problems especially in the packaging and transporting of gelled material.

The second method involved the shipment of the gel former and liquid medium in separate containers. This required the user to formulate the gels and has also resulted in problems. Often, the user does not want to become involved in mixing the gelable dispersions, and many times the user does not have the heating, mixing equipment, quality control, pure water, etc. required for forming good gelable dispersions.

SUMMARY OF THE INVENTION

An embodiment of the invention comprises a pregelling technique for forming stable gelable solutions having a temperature-dependent gel former uniformly dispersed throughout a liquid medium. In this method, the gel-forming agent and liquid medium are mixed, heated to an elevated dispersion temperature, and the gel former is uniformly dispersed throughout the liquid medium at the elevated dispersion temperature. The dispersion temperature is significantly above room temperature, but is below the gel critical temperature necessary to convert the dispersion to the gelled state. On cooling the preheated dispersion, it has been found that the gel-forming agent remains uniformly distributed throughout the liquid medium for extended periods. In addition, the gelable solution has a higher viscosity than prior to such preheating, but it is not gelled.

Gelable solutions prepared by the method of this invention have advantages over those previously available. The gel former remains uniformly distributed throughout the liquid medium for extended periods of time making the gelable solution stable for much longer periods. The gelable solutions of this invention can be more easily shipped to potential users or stored. Once the users obtain the solutions, they also offer the advantages of being more easily pumped, extruded and otherwise handled than either the gelled solutions or the individual components.

DESCRIPTION OF THE PREFERRED EMBODIMENTS

In general, any temperature-dependent gel-forming agent can be used with the method described herein. Examples of some gel formers which are temperature-dependent include such natural gums as locust bean gum, slippery elm gum, gum arabic and guar. Seaweed derivatives such as the alginates are also temperature-dependent, as are the red seaweed derivatives carrageenin, agar, and furcellaran. Synthetic gel formers which are temperature-dependent can also be used. Preferred gel formers are the red seaweed derivatives such as agar, carrageenan and furcellaran, and the particularly preferred gelling agents are the carrageenins. A more detailed description of red seaweed derivatives, particularly carrageenans, can be found in: Colloid-O-Scope, vol. 12, Nos. 1 and 2 (1966), and vol. 13, No. 1 (1967) published by Marine Colloids, Inc., 2 Edison Place, Springfield, N.J.; and Whistler, Industrial Gums (Polysaccharides and Their Derivatives), Academic Press, New York (1959) at pages 83–115. These red seaweed derivatives are commercially available, and one source is Marine Colloids, Inc.

Amounts below about 10% by weight of gel former are usually sufficient to form gelled solutions. Amounts of less than about 5% are particularly preferred and amounts as low as 0.1% can often be used successfully.

To accomplish proper dispersion of the gel former, which is often in powder form, a mixture of gel former and liquid medium is heated to an elevated dispersion temperature. During the initial stages of heating, the gel former tends to swell and is capable of imbibing solution. During this stage, however, no structural bonds are formed upon cooling of the dispersion. As heating continues, a gel critical temperature is reached after which a gel structure will form upon cooling.

The elevated dispersion temperature should be sufficiently above room temperature to provide good dispersion characteristics and should provide the mixture with a higher viscosity upon cooling. Additionally, the elevated dispersion temperature should be sufficiently below the particular gel critical temperature involved so that a definite gel structure is not formed upon cooling the dispersion. This results in a thickened mixture, but one that will easily flow and can be easily pumped.

Of course, the elevated dispersion temperature sufficient or preferable for any particular gelable solution will depend on many factors including the type gel former, amount of gel former present, salt content (especially potassium, sodium and ammonium which will substantially alter the required dispersion temperature), and the critical temperature of the gel. While there is no way to predict the best dispersion temperature for each possible combination of liquid medium and gel former, this can easily be determined by routine experimentation as shown by the examples included infra. Results of such experimentation have shown that the preferred red seaweed polysaccharide gel formers are best dispersed at temperatures above about 100° F., which temperatures are still significantly below their critical temperature. Carrageenin gel-forming agents present in an amount of 2% have been determined to have the best dispersion temperatures between about 115° F. and about 125° F.; while those present in an amount of 3% have a best dispersion temperature between about 115° F. and 130° F.

Liquid media which can be gelled using gel formers described herein include: a pure liquid; solutions or dispersions of a solid in a liquid; and two or more liquids which are miscible. These liquids can be aqueous or nonaqueous.

The gelable dispersions produced as described herein are useful for forming gelled solutions. They are converted to gelled solutions by heating the dispersion to at least its gel critical temperature and subsequently cooling the dispersion below the gelation or setting temperature. In the gelled state, the structural network formed by the gel former acts as a carrier for many types of liquids which can be diffused from the structure for use. For example, gel networks can contain therapeutic solutions, photoprocessing solutions, liquid foods, pharmaceuticals, and a great variety of other liquids.

The following examples further illustrate the invention:

Example I

A carrageenin gel former (Gelcarin HWG, produced by Marine Colloids, Inc.) is employed to form a gelable photoprocessing solution comprising an alkaline developer solution of the following composition:

| | G. |
|---|---|
| Anti-fog #2 (Eastman Kodak) | 0.50 |
| Sodium sulfite | 75.00 |
| Ethylenediaminetetraacetic (EDTA) | 2.00 |
| Phenidone A | 1.00 |
| Hydroquinone | 10.00 |
| Sodium hydroxide | 5.00 |
| Water to make 1.0 liter. | |

The pH of the solution is 10.5.

Two percent by weight (based on the total solution) of the carrageenin is used to form a gelable developer solution. The gel forming powder is added to the developer solution at room temperature. To obtain a stable uniform dispersion of the powder in the liquid medium, the mixture is heated to an elevated dispersion temperature ($T_d$) as indicated in Table I. The powder is uniformly dispersed at the elevated dispersion temperature by hand stirring the mixture, or preferably by using some type of mechanical mixer.

The dispersion is placed in a one liter bottle and allowed to stand at ambient room temperature for seven weeks. After that time, some separation of the dispersion into a bottom layer containing the gel former and a top layer of liquid is noticed for some of the samples. Total height of the one liter bottle is seven inches. The height of the dispersed phase ($H_d$) is a measure of the uniformity of the dispersion after seven weeks, while the height of the liquid phase ($H_l$) is a measure of how much phase separation has occurred. When $H_d$ is equal to seven, no separation has occurred. The results after seven weeks are as follows:

TABLE I

| | Inches | |
|---|---|---|
| $T_d$ (° F.) | $H_d$ | $H_l$ |
| 75 | 2 | 5 |
| 115 | 3 | 4 |
| 127 | 7 | 0 |
| 135 | 7 | 0 |

The dispersion heated to a dispersion temperature of 135° F. has a consistency somewhat like jelly. The other solutions do not show any noticeable structure and are true dispersions.

After the seven-week period, the samples heated to dispersion temperatures of 127° F. and 135° F. are converted to their gelled state by heating them to 170° F. (the gel critical temperature is about 160° F.) and subsequently cooling them to room temperature. Gelation occurs in the temperature range of 125°–130° F. Uniform gels having high break strengths, low syneresis and good overall quality are formed. The gelled developer solution is heat-reversible with a melting or solution temperature in the range of 145°–160° F., and a setting of 125°–130° F. It can be used to develop exposed film by melting it, extruding a thin layer onto the film, cooling, and then peeling the gelled solution from the film.

Example II

The procedure of Example I is followed to form the same gelable developer dispersion except that three percent by weight of the carrageenin gel former is used. The dispersion is again formed at elevated temperatures, and the amount of phase separation noted after four weeks of standing in a one liter bottle at ambient room temperature is given in Table II.

TABLE II

| $T_d$ (° F.) | $H_d$ (inches) | $H_l$ (inches) |
|---|---|---|
| 72 | 3 | 4 |
| 115 | 6 | 1 |
| 127 | 7 | 0 |

Example III

This example shows a relationship between the gel critical temperature and optimum dispersion temperature for a gelable dispersion of Example I. The critical temperature of the dispersion is varied by adding potassium chloride or sodium chloride. Samples with 15 grams per liter of potassium chloride added have a gel critical temperature of 165° F. Samples with 15 grams per liter of sodium chloride added have a gel critical temperature of 130° F. The dispersion procedure of Example I is used, and upon cooling the following results are obtained:

TABLE III

| $T_d$ (° F.) | 15 g./l. KCl ($T_c$=165°F.) | 15 g./l. NaCl ($T_c$=130° F.) |
|---|---|---|
| 115 | No dispersion | Jelly structure. |
| 130 | do | Gelled solution. |
| 140 | Uniform dispersion | Do. |
| 150 | Jelly structure | Do. |

Although the invention has been illustrated by way of photoprocessing gels, it should be understood that the invention is broadly applicable to all gelled solutions formed with temperature-dependent gel formers. Many other embodiments besides those specifically illustrated which are within the scope of the appended claims will be apparent to those skilled in the art.

What is claimed is:

1. A method for forming a stable gelable dispersion having a temperature-dependent gel former dispersed throughout a liquid medium, comprising:
   (a) adding to said liquid medium a material consisting essentially of a gel former in an amount sufficient to gel the liquid medium;
   (b) heating the mixture to a maximum of an elevated dispersion temperature, said dispersion temperature being lower than the gel-critical temperature for said gel former;
   (c) dispersing said gel former throughout said liquid medium at said elevated dispersion temperature until a uniform dispersion is formed; and,
   (d) cooling said dispersion to an ambient temperature significantly below said elevated dispersion temperature whereby a uniform, stable dispersion of gel former in a liquid medium is obtained which is suitable for storage or shipment at the ambient temperature.

2. A method of claim 1 wherein said gel former is present in an amount of less than about 10% by weight.

3. A method of claim 2 wherein said gel former comprises a red seaweed polysaccharide.

4. A method of claim 3 wherein said mixture is heated to an elevated dispersion temperature of at least about 100° F.

5. A method of claim 4 wherein said gel former comprises a carrageenin.

6. A method of claim 5 wherein said liquid medium comprises a photoprocessing solution.

7. A method of claim 6 wherein said photoprocessing comprises a developer solution.

8. In the method of forming a stable dispersion from a mixture consisting essentially of a temperature-dependent gel former in a liquid medium, the improvement comprising:
   heating a mixture of said gel former and said liquid medium to a maximum of an elevated dispersion temperature, said elevated dispersion temperature being above room temperature, but below the gel-critical temperature for said gel former and said liquid medium, dispersing said gel former throughout said liquid medium, at the elevated temperature; and, cooling said dispersion to an ambient temperature significantly below said elevated dispersion temperature whereby a uniform, stable dispersion of gel former in liquid medium is obtained which is suitable for storage or shipment at the ambient temperature.

References Cited

UNITED STATES PATENTS

| 2,927,055 | 3/1960 | Lanzet | 252—316 X |
| 3,113,866 | 12/1963 | Land | 96—50 |
| 1,995,281 | 3/1935 | Epstein | 252—311 X |
| 3,436,355 | 4/1969 | Bakan | 252—316 |

RICHARD D. LOVERING, Primary Examiner

U.S. Cl. X.R.

96—48 R, 63; 106—208; 252—316